(12) United States Patent
Li et al.

(10) Patent No.: US 8,646,947 B2
(45) Date of Patent: Feb. 11, 2014

(54) MULTICOLOR ILLUMINATION DEVICE USING MULTIPLE LIGHT SOURCES AND A MOVING PLATE WITH WAVELENGTH CONVERSION MATERIALS

(75) Inventors: Yi Li, Pleasanton, CA (US); Yi Yang, Shen Zhen (CN)

(73) Assignee: Appotronics Corporation Limited, Shenzhen (CN)

( * ) Notice: Subject to any disclaimer, the term of this patent is extended or adjusted under 35 U.S.C. 154(b) by 134 days.

(21) Appl. No.: 13/171,448

(22) Filed: Jun. 29, 2011

(65) Prior Publication Data

US 2013/0003368 A1  Jan. 3, 2013

(51) Int. Cl.
*F21V 9/00*  (2006.01)

(52) U.S. Cl.
USPC .............................................. 362/293; 362/84

(58) Field of Classification Search
USPC .................. 362/293, 84; 348/743; 353/84
See application file for complete search history.

(56) References Cited

U.S. PATENT DOCUMENTS

| | | | |
|---|---|---|---|
| 6,252,636 B1 * | 6/2001 | Bartlett | 348/743 |
| 2004/0189955 A1 * | 9/2004 | Park | 353/84 |
| 2006/0007683 A1 * | 1/2006 | Clark et al. | 362/268 |
| 2009/0187234 A1 * | 7/2009 | Meyer et al. | 607/88 |
| 2009/0244495 A1 * | 10/2009 | Ogawa | 353/84 |
| 2010/0097578 A1 * | 4/2010 | Yeh et al. | 353/33 |

* cited by examiner

*Primary Examiner* — Julie Shallenberger

(74) *Attorney, Agent, or Firm* — Chen Yoshimura LLP

(57) ABSTRACT

A multicolor illumination device uses a blue or UV light source to excite wavelength conversion materials and a red light source as a direct illumination light. The lights from the two light sources are combined onto a moving wavelength conversion element. The moving wavelength conversion element includes multiple segments alternatingly disposed in the paths of the incident lights, including a first segment with no wavelength conversion material, and other segments which may carry blue, green and/or yellow wavelength conversion materials. A control system controls the on/off of the two light sources so that when the first segment is in the light path, the red light source is on and the blue/UV light source is off, and vice versa when the other segments are in the light path. Alternatively, dichroic filters may be fixedly provided on the segments of the wavelength conversion element to block the blue/UV or red light.

22 Claims, 2 Drawing Sheets

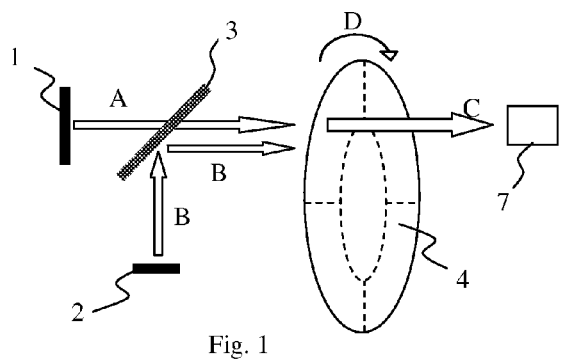
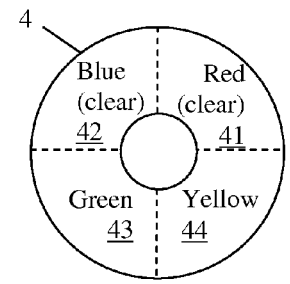
Fig. 1
Fig. 2
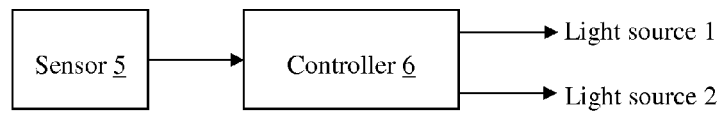
Fig. 3
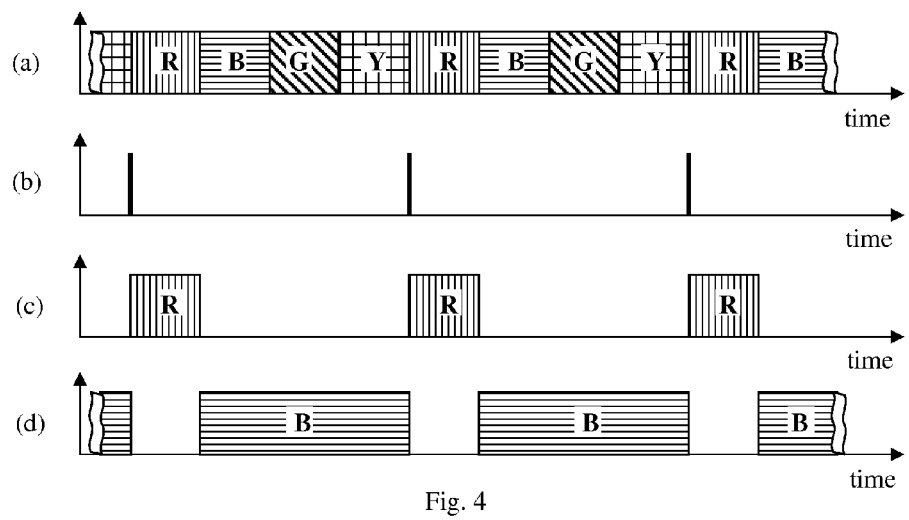
Fig. 4

MULTICOLOR ILLUMINATION DEVICE USING MULTIPLE LIGHT SOURCES AND A MOVING PLATE WITH WAVELENGTH CONVERSION MATERIALS

BACKGROUND OF THE INVENTION

1. Field of the Invention

This invention relates to lighting devices and systems, and in particular, it relates to devices for generating high brightness multicolor light using wavelength conversion.

2. Description of the Related Art

Wavelength conversion methods that use excitation light produced by solid-state light source such as laser diodes (LDs) or light emitting diodes (LEDs) and wavelength conversion materials such as phosphors or quantum dots can produce high brightness light at wavelengths different from the wavelength of the excitation light. In conventional devices, excitation light impinges on a wavelength conversion material, which absorbs the excitation light and emits light (the converted light) at a wavelength higher than the wavelength of the excitation light. To generate light of different colors, different wavelength conversion materials are typically employed.

U.S. Pat. No. 7,547,114, issued Jun. 16, 2009, describes a wavelength conversion-based multicolor illumination device which employs an excitation light source and a multi-segmented moving plate having wavelength conversion materials (e.g. phosphors). The exciting light source is a light emitting diode or a laser diode emitting in the UV and/or blue region. Each segment of the moving plate contains a different wavelength conversion material or no wavelength conversion material. The plate is supported to move so that different segments are exposed to the excitation light at different times. When the plate moves, light of different colors is generated sequentially in time by the different wavelength conversion materials in different segments of the plate. This multicolor illumination device is useful in a projector system having a microdisplay imager for image display.

Chinese patent application publication CN 101592308A, published Dec. 12, 2009, describes a wavelength conversion-based multicolor illumination device which employs two light sources. The first light source emits an excitation light (e.g. blue or UV) for exciting wavelength conversion materials. The excitation light is introduced onto a rotating wheel which includes multiple segments each carrying a wavelength conversion material. The light from second light source (blue or red) is combined with the converted light from the wavelength conversion material by a dichroic filter which is located downstream from the wavelength conversion material. The second light source can be controlled to turn on and off; for example, it may be turned on only when the rotating wheel is rotated to near a boundary of two segments. This system is designed to solve the problem of spoke light associated with the rotating wheel. Spoke light refers to the undesirable mixing of different color lights occurring at the boundary of two segments of the wheel due to scattering of the converted light and/or other factors.

Chinese patent application publication CN 101858496A, published Oct. 13, 2010, describes a wavelength conversion-based multicolor illumination device that employs two light sources of different colors. The two light sources, one emitting a blue light and the other emitting a UV light, are both disposed before the wavelength conversion material. The blue and UV lights are combined by a light combination element and introduced onto a rotating wavelength conversion element. The wavelength conversion element has multiple segments carrying different wavelength conversion materials, such as red and green phosphors, as well as a clear segment that does not carry any wavelength conversion material but transmits the blue light. Both the UV light and the blue light are used for exciting the wavelength conversion materials. When the clear segment is rotated into the path of the incident light, the UV light source is turned off, and only the blue light is transmitted through the clear segment to produce a blue output light. When the segments carrying wavelength conversion materials are rotated into the path of the incident light, both the blue and UV light sources are turned on to excite the wavelength conversion materials. A sensor is provided to sense the position of the rotating wavelength conversion element and generate a signal for controlling the turning on and off of the UV light source.

SUMMARY OF THE INVENTION

The present invention is directed to a multicolor illumination device that substantially obviates one or more of the problems due to limitations and disadvantages of the related art.

An object of the present invention is to provide a multicolor illumination device in which the red light is provided by a red light source directly rather than by wavelength conversion.

Additional features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, the present invention provides a multicolor illumination device which includes: a first light source emitting a first light; a second light source emitting a second light; a wavelength conversion element having at least three segments, including a first segment free of any wavelength conversion material, a second segment either carrying a first wavelength conversion material which absorbs the first light and emits a third light or is free of any wavelength conversion material, and a third element carrying a second wavelength conversion material which absorbs the first light and emits a fourth light; optical element for introducing the first and second lights onto the wavelength conversion element as incident lights, wherein the wavelength conversion element is moveable relative to the first and second light sources so that the first, second and third segments are alternatingly disposed in paths of the incident lights; an output port disposed to receive lights outputted from the wavelength conversion element; and means for allowing lights originating from the first light to be output to the output port while preventing lights originating from the second light to be output to the output port during a first time period, and for allowing lights originating from the second light to be output to the output port while preventing lights originating from the first light to be output to the output port during a second time period, wherein the first time period is a time period when the second or third segment of the wavelength conversion element is disposed in the paths of the incident lights, and the second time period is a time period when the first segment of the wavelength conversion element is disposed in the paths of the incident lights, and wherein the first and second time periods do not overlap in time.

In another aspect, the present invention provides a multicolor illumination device which includes: a first light source emitting a first light, the first light being a blue or UV light; a second light source emitting a second light, the second light being a red light; a wavelength conversion element having at least three segments, including a first segment free of any wavelength conversion material, a second segment either carrying a first wavelength conversion material which absorbs the first light and emits a third light or is free of any wavelength conversion material, and a third element carrying a second wavelength conversion material which absorbs the first light and emits a fourth light; and optical elements for introducing the first and second lights onto the wavelength conversion element as incident lights, wherein the wavelength conversion element is moveable relative to the first and second light sources so that the first, second and third segments are alternatingly disposed in paths of the incident lights, wherein the first light source is turned on during at least a first time period when the second or third segment of the wavelength conversion element is disposed in the paths of the incident lights, and the second light source is turned on during at least a second time period when the first segment of the wavelength conversion element is disposed in the paths of the incident lights.

In yet another aspect, the present invention provides a multicolor illumination device which includes: a first light source emitting a first light; a second light source emitting a second light; a wavelength conversion element having at least three segments, including a first segment free of any wavelength conversion material, a second segment either carrying a first wavelength conversion material which absorbs the first light and emits a third light or is free of any wavelength conversion material, and a third element carrying a second wavelength conversion material which absorbs the first light and emits a fourth light; optical elements for introducing the first and second lights onto the wavelength conversion element as incident lights, wherein the wavelength conversion element is moveable relative to the first and second light sources so that the first, second and third segments are alternatingly disposed in paths of the incident lights; wherein the first light source is turned on during a first time period when the second or third segment of the wavelength conversion element is disposed in the paths of the incident lights and turned off during a second time period when the first segment of the wavelength conversion element is disposed in the paths of the incident lights, and the second light source is turned on during the second time period and turned off during the first time period.

It is to be understood that both the foregoing general description and the following detailed description are exemplary and explanatory and are intended to provide further explanation of the invention as claimed.

BRIEF DESCRIPTION OF THE DRAWINGS

FIG. 1 schematically illustrates a multicolor illumination device according to an embodiment of the present invention.

FIG. 2 schematically illustrates a moving plate carrying wavelength conversion materials used in the multicolor illumination device of FIG. 1

FIG. 3 schematically illustrates a control system for the multicolor illumination device of FIG. 1.

FIG. 4 illustrates a timing sequence of the moving plate, the sensor signal and the light source of the multicolor illumination device of FIG. 1.

DETAILED DESCRIPTION OF THE PREFERRED EMBODIMENTS

Figure 5A:
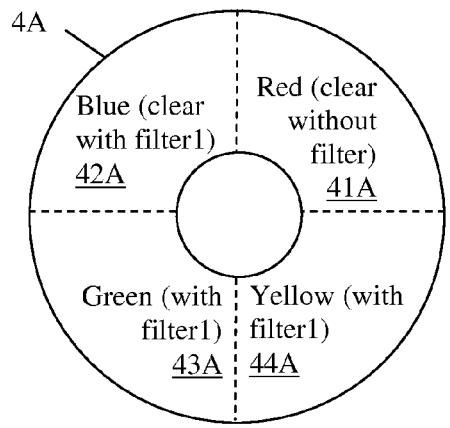
FIGS. 5A-5C illustrate constructions of the wavelength conversion element used in second, third and fourth embodiments of the present invention.

A multicolor illumination system is typically required to produce multiple primary colors such as red, green and blue lights that can be mixed to generate other desired colors. A multicolor illumination system may also be required to produce a yellow light that is mixed with a blue light to generate a white light. To produce multicolor light using wavelength conversion, one key requirement is the availability of wavelength conversion materials that converts the excitation light into desired colors such as red, green, blue, yellow, etc. (although blue light sources are often used directly as the blue light without wavelength conversion). However, different wavelength conversion materials often have different efficiencies. For example, among currently available wavelength conversion materials, phosphor materials that generate red converted light (referred to as red phosphors here for convenience) tend to have lower efficiency and reliability than other phosphors, such as green and yellow phosphors.

To solve this problem, embodiments of the present invention provide a multicolor illumination device that employs two (or more) light sources of different colors, where the first light source produces a blue or UV light used as excitation light for wavelength conversion materials, and the second light source produces a red light (or a green light) which is used directly for illumination rather than as an excitation light. Because red LEDs are readily available and offer high brightness, using a red LED to eliminate the need for a red phosphor is advantageous. In embodiments of the present invention, the lights from the first and second light sources are combined before they are introduced onto a moving element carrying wavelength conversion materials. The first and second light sources may be controlled to turn on and off as will be described in more detail later.

A multicolor illumination device according to a first embodiment of the present invention is described with reference to FIGS. 1-4. FIG. 1 schematically illustrates the optical arrangement of the multicolor illumination device. The multicolor illumination device includes a first light source 1, a second light source 2, a light combination element 3, and a wavelength conversion element 4. The first light source 1 emits an excitation light (first light), preferably in the blue or UV range. The second light source 2 emits a second light, which is a red light in the preferred embodiment. In other embodiments, the second light may be green or other colored lights. The first and second light sources may be LEDs, laser diodes, or other solid state light sources.

The light combination element 3 is disposed between the wavelength conversion element 4 and the first and second light sources 1, 2. It combines the first and second lights from the first and second light sources 1, 2 and directs the two lights to the wavelength conversion element 4. In one implementation, the wavelength combination element 3 is a dichroic filter that reflects one of the first and second lights and transmits the other one of the first and second lights. In the particular arrangement shown in FIG. 1, the dichroic filter 3 transmits the first light from the first light source 1 (as indicated by the arrow A) and reflects the second light from the second light source 2 (as indicated by the arrows B). Preferably, the first light and second light occupy the same path after the light combination element 3. (It should note that in FIG. 1, the arrows A and B are drawn in an offset manner for convenience of illustration only.) Another example of a light combination element 3 is an optical fiber bundle that has a branched end and a fused end.

The light combination element 3 is optional. For example, this element is not necessary for if the first and second light sources 1, 2 are lasers, because lasers typically have small emitting angle and can introduced onto the wavelength conversion element 4 from different angles. Moreover, if the first and second lights are introduced from opposite directions, there is no need to a light combination element.

In the embodiment shown in FIG. 1, the wavelength conversion element 4 is a transmission type, i.e. the output light from the wavelength conversion element (as indicated by the arrow C) travels in the same direction as the incident light A/B. In an alternative embodiment, the wavelength conversion element 4 is a reflection type, i.e., the output light from the wavelength conversion element travels in approximately the opposite direction or at an angle with respect to the incident light A/B. In other alternative embodiments, the first and second lights A, B are introduced onto the wavelength conversion element 4 from opposite sides, and the wavelength conversion element is a mixed transmission/reflection type. For example, in one such alternative embodiment, the first light is introduced onto the wavelength conversion element in a first direction, the second light is introduced in a second direction (i.e. from the opposite side), and the output light travels in the first direction (in this case, the wavelength conversion element generates converted light traveling in the first direction and reflects the second light back in the first direction). In another such alternative embodiment, the first light is introduced onto the wavelength conversion element in a first direction, the second light is introduced in a second direction (i.e. from the opposite side), and the output light travels in the second direction (in this case, the wavelength conversion element generates converted light traveling in the second direction and transmits the second light in the second direction). The detailed descriptions below focus on the transmission type (FIG. 1); to implement the various alternative types of devices, the locations of various components may be changed, and various different or additional optical elements such as dichroic filters may be used as a part of the wavelength conversion element or elsewhere in the optical paths as appropriate. The present invention encompasses all such various types of devices. Based on the descriptions in this disclosure and general knowledge, those skilled in the art will be able to implement the alternative types of devices without undue experimentation.

The output port of the multicolor illuminating device is schematically illustrated as element 7. The output port may use any suitable optical elements to collect and receive the light output from the wavelength conversion element 4.

Other optical elements may be present in the illumination device but are not shown in FIG. 1, such as focusing and/or beam shaping optics located before the wavelength conversion element 4, light collecting optics located after the wavelength conversion element, color filters, etc.

The wavelength conversion element 4 has a surface that includes into multiple segments. Each segment either carries a wavelength conversion material that absorbs the excitation light and emits a converted light, or carries no wavelength conversion material (referred to as being "clear" here). The wavelength conversion element 4 is mounted on a support structure (not shown) that causes it to move in a manner such that different segments of the wavelength conversion element are alternately located on the paths of the incident lights A and B.

In the embodiment shown in FIGS. 1 and 2, the wavelength conversion element 4 is implemented as a circular shaped plate disposed in a plane perpendicular to the direction of the incident light A/B and supported to rotate (as indicated by the arrow D) around an axis parallel to the incident light. A peripheral region of the circular shaped wavelength conversion element 4 is divided into multiple segments 41-44 arranged in an angular direction. When the wavelength conversion element 4 rotates, different segments are on the paths of the incident lights during different time periods.

In an alternative implementation (not shown), the wavelength conversion element 4 is a plate having multiple segments arranged in a linear direction, and the plate moves in the linear direction in an oscillating motion. In another alternative implementation (not shown), the wavelength conversion element 4 is a rotating cylinder having multiple segments arranged in the angular direction on the cylinder. The mechanical and electrical structures that implement the movement of the wavelength conversion element are familiar to those skilled in the relevant art.

In the preferred embodiment shown in FIG. 2, the wavelength conversion element 4 has four adjoining segments 41, 42, 43 and 44. Segments 43 and 44 carry a green and a yellow wavelength conversion material, respectively, which absorbs the excitation light generated by the first light source and emits a green light and a yellow light, respectively. Segment 42 either carries no wavelength conversion material and transmits the excitation light if the excitation light is blue, or carries a blue wavelength conversion material that emits a blue light if the excitation light is UV. Segment 41 carries no wavelength conversion material and transmits the red light of the second light source 2. Alternatively, segment 44 carrying a yellow phosphor may be omitted.

Optionally, a filter to block the residual blue or UV light may be provided behind the green and yellow segments. Alternatively, sufficiently thick layers of wavelength conversion material may be used to reduce the residual blue or UV light. Also, a UV blocking filter may be optionally provided in the light path after the wheel.

In the first embodiment, the first and second light sources 1, 2 are controlled to turn on and off in a controlled manner, and their on/off periods are synchronized with the movement of the wavelength conversion element 4 to generate an output light C having various colors during different time periods. Specifically, the first light source 1 (blue or UV excitation light) is controlled to turn on when segments 42, 43 and 44 are rotated to the paths of the incident lights, and turn off when segment 41 is rotated to the paths of the incident lights. The second light source 2 (red direct illumination light) is controlled to turn on when segment 41 is rotated to the paths of the incident lights, and turn off when segments 42, 43 and 44 are rotated to the paths of the incident lights. As a result, the output light C collected after the wavelength conversion element 4 is blue, green and yellow when segments 42, 43 and 44 are rotated to the paths of the incident lights, respectively, and red when segment 41 is rotated to the paths of the incident lights. In this manner, the red light of the second light source 2 is used directly as an illumination light, not as an excitation light for a wavelength conversion material.

For a transmission type wavelength conversion element 4, the clear segments 41 and 42 are constructed to transmit the respective red and blue lights. For a reflection type wavelength conversion element 4, the clear segments 41 and 42 are constructed to reflect the respective red and blue lights.

It should be appreciated that in FIG. 2, the color labels for segments 41-44 correspond to the color of the output light, not necessarily the color of the wavelength conversion material because segments 41 and 42 may not have any wavelength conversion material.

Using the wavelength conversion element 4 shown in FIG. 2, the sequence of the color of the output light C is red-bluegreen-yellow-red- . . . . Each color is outputted approximately 25% of the time, due to the equal sizes of the four segments 41-44. Alternatively, the wavelength conversion element 4 may be designed to output other desirable color sequences, and/or colors that have non-equal durations.

A control system is provided to synchronize the on/off status of the first and second light sources 1, 2 and the movement of the wavelength conversion element 4. As shown in FIG. 3, the control system includes a sensor 5 which senses the positions of the wavelength conversion element 4 and generates a signal indicating the sensed positions. Based on this signals from the sensor 5, a controller 6 generates control signals to turn on and off the first and second light sources 1, 2. The controller 6 may be one unit that controls both light sources, or it may be two units that separately control the two light sources.

Any suitable sensor system may be used to implement the sensor 5, and the sensor may be coupled to sense the movement of the wavelength conversion element 4 in any suitable manner. For example, the sensor 5 may be an optical encoder, resolver, Hall effect device, etc. that senses the position of the wavelength conversion element 4. Alternatively, the sensor may be an optical sensor that senses the color of the output light C from the wavelength conversion element 4, which is correlated with the position of the wavelength conversion element.

The actual mechanism of turning the light sources 1, 2 on and off may involve turning on and off the power supplied to the light sources, or it may involve using a mechanical, optical or other types of shutter to block the light from the respective light sources. If shutters are used, they would be located between the respective light sources 1, 2 and the light combination element 3. The shutters may also be an integral part of the light sources. Thus, the term "turning on and off of the light sources" should be broadly understood to cover any implementation that can allow or prevent the lights from the light sources reaching the wavelength conversion element 4.

In one particular implementation, the sensor 5 generates a pulse signal each time the wavelength conversion element 4 is rotated to a position such that the boundary between segment 44 (yellow) and segment 41 (red) passes the paths of the incident lights. When the controller 6 receives a pulse from the sensor 5, it turns the second light source on and the first light source off; then, after a predetermined time period, it turns the second light source off and the first light source on. Then, when another pulse is received from the sensor 5, the controller 6 turns the second light source on and the first light source off, and the sequence of events repeat. In one example, the rotation period of the wavelength conversion element 4 is 10 ms, and the predetermined time period is 2.5 ms.

FIG. 4 shows a timing sequence of the wavelength conversion element 4, sensor 5 and light sources 1, 2 for this embodiment. Rows (a)-(d) are along the same time axis (arbitrary unit). Row (a) represents the movement of the wavelength conversion element 4 as well as the color of the output light from the wavelength conversion element. For example, the blocks labeled "R" represent time periods during which the red segment 41 is located on the paths of the incident lights, and when red light is output; the blocks labeled "B" represent time periods during which the blue segment 42 is located on the paths of the incident lights, and when blue light is output; etc. Row (b) depicts the pulse signals generated by the sensor 5. Rows (c) and (d) represent the on/off state of the second (red) and first (blue) light sources, respectively; the blocks labeled "R" represent the time periods during which the second (red) light source is on, and the blocks labeled "B" represent the time periods during which the first (blue or UV) light source is on.

The timing sequence shown in FIG. 4 is only an example; other timing sequence may be used. For example, the pulse signal may be generated when the boundary between the red segment 41 and blue segment 42, or elsewhere during the rotation of the wavelength conversion element 4.

Second, third and fourth embodiments of the present invention are described with reference to FIGS. 5A-5C. The optical arrangements of the second to fourth embodiments are generally the same as in the first embodiment (FIG. 1), except for the construction of the wavelength conversion element 4. In the second to fourth embodiments, suitable dichroic filters are fixedly provided on (and therefore move in synchrony with) some segments of the wavelength conversion element, thereby eliminating the need to turn off one or both of the light sources 1 and 2.

FIG. 5A shows the wavelength conversion element 4A used in the second embodiment. The wavelength conversion element 4A has four adjoining segments 41A-44A. In terms of the wavelength conversion materials carried or not carried by the segments, segments 41A-44A are the same as segments 41-44 of the first embodiment. However, a dichroic filter that reflects the second (red) light but transmits the first (blue or UV) light is disposed on the blue, green and yellow segments 42A, 43A and 44A. No filter is disposed on the red segment 41A. Using such a wavelength conversion element 4A, the second (red) light source does not need to be turned off when the blue, green and yellow segments 42A, 43A and 44A are rotated into the paths of the incident lights A and B. In other words, the second (red) light source may be left continuously on. The first (blue or UV) light source still needs to be turned off when the red segment 41A is rotated into the paths of the incident lights A and B.

Figure 5B:
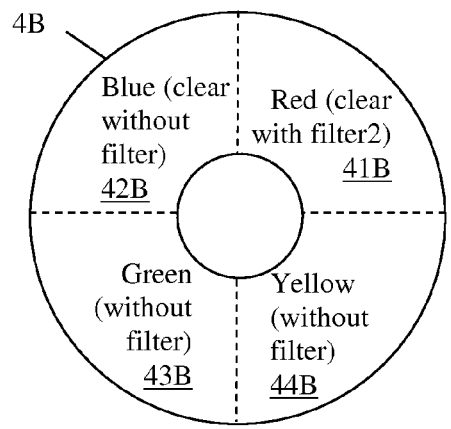

FIG. 5B shows the wavelength conversion element 4B used in the third embodiment. The wavelength conversion element 4B has four adjoining segments 41B-44B. In terms of the wavelength conversion materials carried or not carried by the segments, segments 41B-44B are the same as segments 41-44 of the first embodiment. However, a dichroic filter that reflects the first (blue or UV) light but transmits the second (red) light is disposed on the red segment 41B. No filter is disposed on the blue, green and yellow segments 42B, 43B and 44B. Using such a wavelength conversion element 4B, the first (blue or UV) light source does not need to be turned off when the red segment 41B is rotated into the paths of the incident lights A and B. In other words, the first (blue or UV) light source may be left continuously on. The second (red) light source still needs to be turned off when the blue, green and yellow segments 42B, 43B and 44B are rotated into the paths of the incident lights A and B.

Figure 5C:
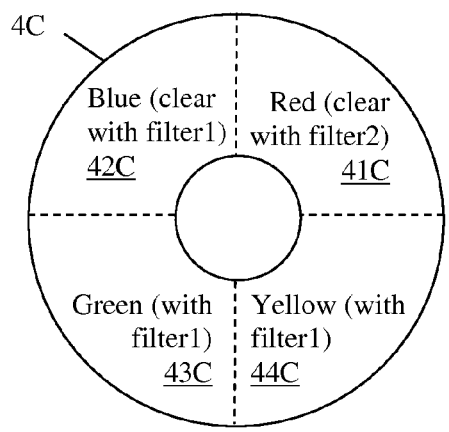

FIG. 5C shows the wavelength conversion element 4C used in the fourth embodiment. The wavelength conversion element 4C has four adjoining segments 41C-44C. In terms of the wavelength conversion materials carried or not carried by the segments, segments 41C-44C are the same as segments 41-44 of the first embodiment. However, a dichroic filter that reflects the second (red) light but transmits the first (blue or UV) light is disposed on the blue, green and yellow segments 42C, 43C and 44C, and a dichroic filter that reflects the first (blue or UV) light but transmits the second (red) light is disposed on the red segment 41C. Using such a wavelength conversion element 4C, both the first (blue or UV) and the second (red) light sources may be left continuously on. For the fourth embodiment, the control system including the sensor 5 and controller 6 (FIG. 3) may be eliminated.

In the second to fourth embodiments, the dichroic filters are located on the entire areas of the corresponding segments. In the second and fourth embodiments, the dichroic filters are preferably located on the side of the wavelength conversion materials facing the excitation light. Alternatively, the filters may be located on the side of the output light. However, in the latter configuration, loss of light may occur, for example, if the output light of the wavelength conversion material (e.g. yellow light) and the second light (e.g. red) have spectral overlap.

Further, if the wavelength conversion element 4B/4B/4C is a reflection type, the dichroic properties of the filters should be reversed. In other words, the dichroic filter for the red segment 41A/41C should reflect second (red) light and transmit the first (blue or UV) light. The dichroic filters for the blue, green and yellow segments 42A/42A, 43A/43C and 44A/44C should reflect the first (blue or UV) light and transmit the second (red) light. Also, in such configurations, the dichroic filters should be located on the side of the wavelength conversion materials facing away from the incident light.

From the above descriptions of the first to fourth embodiments, it can be seen that from a functional standpoint, the requirements for the multicolor illumination device is the following: in the "red" time period (i.e. when the red segment 41/41A/41B/41C is in the paths of the incident lights), red light from the second light source is output after the wavelength conversion element 4, but the blue light is not. In the "non-red" time period (i.e. when segments other than the red segment is in the paths of the incident lights), the converted light or the blue light from the first light source is output, but the red light is not.

Stated more broadly, a characteristic of the multicolor illumination device of the above embodiments of the present invention is that, during a first time period (e.g. the non-red time period), only lights that originate from the first light (e.g., the blue light itself or converted light produced by the wavelength conversion material when excited by the blue or UV light) are output after the wavelength conversion element 4; during the second time period (e.g. the red time period), only lights that originate from the second light (e.g. the red light itself) are output. The two time periods do not overlap in time.

Various structures are described above for performing the function of allowing lights originating from the first light to be output to the output port while preventing lights originating from the second light to be output to the output port during a first time period, and allowing lights originating from the second light to be output to the output port while preventing lights originating from the first light to be output to the output port during a second time period which non-overlapping with the first time period. In the first embodiment described in detail earlier, the structure for performing the above function include the control structure for controlling the on/off of the two light sources in a synchronized manner with the wavelength conversion element. In the second and third embodiments described in detail earlier, the structure for performing the above function includes the control structure for controlling the on/off of one of the two light sources in a synchronized manner with the wavelength conversion element, coupled with appropriate dichroic filters provided for selected segments of the wavelength conversion element. In the fourth embodiment described in detail earlier, the structure for performing the above function includes appropriate dichroic filters provided for selected segments of the wavelength conversion element. Other structures may be also possible.

Under some circumstance, this requirement of non-overlap of the two time periods described above may be relaxed. For example, when the first light is blue and the second light is red, and when segment 41 and segment 42 are both clear (see FIG. 2), then the on and off of the blue and red lights may be controlled such that the blue light and red light may be simultaneously turned on during a period when segment 41 and/or 42 is in the paths of the incident light. This may result in a purple light being output for a period of time.

It can be seen that a difference between embodiments of the present invention and the system described in above-mentioned Chinese patent application publication CN 101858496A is that in the latter, during a substantial part of the entire time, converted lights originating from both light sources (UV and blue) are simultaneously output. In this system, both light sources being simultaneously turned on during a substantial portion (e.g. $2/3$ or $3/4$) of the entire time, and the system is designed so that the wavelength conversion materials are excited by both light sources. In most embodiments of the present invention, as explained above, lights originating from the first light source and lights originating from the second light source are not designed to be simultaneously output (simultaneous output may be allowed to occur in limited conditions when the two light sources are blue and red).

Further, it can be seen that one difference between embodiments of the present invention and the system described in above-mentioned Chinese patent application publication CN 101592308 is the location of the light combination element (dichroic filter) on the optical path. In embodiments of the present invention, the light combination element 3 is located upstream of the wavelength conversion materials 4. In CN 101592308, the light combination element is located downstream of the wavelength conversion materials.

One reason for the configuration of CN 101592308 is that in that device, the second light source functions to correct the spoke light problem generated by the rotating wheel, therefore it is not appropriate to place the second light source upstream of the rotating wheel. In that device, the light of the second light source is combined with the converted light of the wavelength conversion materials by a dichroic filter. A dichroic filter combines two lights based on the non-overlapping nature of the spectra of the two lights. Thus, in the system of CN 101592308, the wavelength spectra of the second light source and of the converted light must be substantially separated in order for them to be combined by the dichroic filter. If their spectra overlap, the overlapping portion will be lost for one of the two lights. This issue limits the choices of the wavelength conversion materials and the color of the second light source. For example, the spectrum of a typical yellow phosphor overlaps substantially with the spectrum of a typical red LED. Thus, if the second light source is a red LED, then yellow phosphors will not be suitable as a wavelength conversion material for the rotating wheel. This is significant limitation because yellow phosphors are a widely used wavelength conversion material due to their high light conversion efficiency.

In embodiments of the present invention, because the spectra of the first light (excitation light, blue or UV) and the second light (direct illumination light, red or green or other colors) have no substantial overlap, the dichroic filter 3 can combine these two lights without undue loss, thereby obviating the problem of CN 101592308 discussed above.

In embodiments of the present invention, because the second light is used directly as an illumination light rather than an excitation light, the second light is not required to (although it may) have the ability to excite the wavelength conversion material. While in the above-described embodiments the second light source 2 is a red light source, a green light source may be alternatively used to provide a green direct illumination light. In such an alternative embodiment, segment 41 of the wavelength conversion material will carry a red wavelength conversion material, and segment 43 will carry no wavelength conversion material but will pass green light. Other adjustments to the system may be made accordingly.

It will be apparent to those skilled in the art that various modification and variations can be made in the multicolor illumination device and related method of the present invention without departing from the spirit or scope of the invention. Thus, it is intended that the present invention cover modifications and variations that come within the scope of the appended claims and their equivalents.

What is claimed is:

1. A multicolor illumination device comprising:
   a first light source emitting a first light;
   a second light source emitting a second light;
   a wavelength conversion element having at least two segments, including a first segment free of any wavelength conversion material, and a second segment carrying a first wavelength conversion material which absorbs the first light and converts the absorbed first light into a third light having longer wavelengths than the absorbed first light;
   optical elements for introducing the first and second lights onto the wavelength conversion element as incident lights,
   wherein the wavelength conversion element is moveable relative to the first and second light sources so that the first and second segments are alternatingly disposed in paths of the incident lights;
   an output port disposed to receive lights outputted from the wavelength conversion element; and
   means for allowing lights originating from the first light to be output to the output port while preventing lights originating from the second light to be output to the output port during a first time period, and for allowing lights originating from the second light to be output to the output port while preventing lights originating from the first light to be output to the output port during a second time period, wherein the first time period is a time period when the second segment of the wavelength conversion element is disposed in the paths of the incident lights, and the second time period is a time period when the first segment of the wavelength conversion element is disposed in the paths of the incident lights, and wherein the first and second time periods do not overlap in time.

2. The multicolor illumination device of claim 1, wherein the wavelength conversion element further has a third segment either carrying a second wavelength conversion material which absorbs the first light and converts the absorbed first light into a fourth light having longer wavelengths than the absorbed first light or is free of any wavelength conversion material, and when the third segment is disposed in the paths of the incident lights, the means allows lights originating from the first light to be output to the output port while preventing lights originating from the second light to be output to the output port.

3. The multicolor illumination device of claim 2, wherein the first light from the first light source is a blue or UV light, the second light from the second light source is a red light, the third light emitted by the first wavelength conversion material is a green light, and the fourth light emitted by the second wavelength conversion material is a blue light.

4. The multicolor illumination device of claim 3, wherein the wavelength conversion element further comprises a fourth segment carrying a third wavelength conversion material which absorbs the first light and converts the absorbed first light into a yellow light.

5. The multicolor illumination device of claim 2, wherein the means includes:
   a sensor coupled to the wavelength conversion element for sensing elative movement positions of the wavelength conversion element and generating sensor signals representing the sensed positions; and
   a controller coupled to the sensor for generating control signals for turning on and off the first light source or the second light source or both based on the sensor signals.

6. The multicolor illumination device of claim 5, wherein the sensor signals represent the start of the first or second time period, wherein the controller generates control signals to turn on the first light source and turn off the second light source at the start of the first time period, and to turn on the second light source and turn off the first light source at the start of the second time period.

7. The multicolor illumination device of claim 2, wherein the means includes a first dichroic filter fixedly disposed on the second and third segments of the wavelength conversion element, the first dichroic filter preventing the second light from being output to the output port when it is disposed in the paths of the incident lights.

8. The multicolor illumination device of claim 7, wherein the means further includes:
   a sensor coupled to the wavelength conversion element for sensing elative movement positions of the wavelength conversion element and generating sensor signals representing the start of the first or second time period; and
   a controller coupled to the sensor for generating control signals for turning the first light source off during the second time prior and on during the first time period based on the sensor signals.

9. The multicolor illumination device of claim 7, wherein the means further includes a second dichroic filter fixedly disposed on the first segment of the wavelength conversion element, the second dichroic filter preventing the first light from being output to the output port when it is disposed in the paths of the incident lights.

10. The multicolor illumination device of claim 2, wherein the means includes a second dichroic filter fixedly disposed on the first segment of the wavelength conversion element, the second dichroic filter preventing the first light from being output to the output port when it is disposed in the paths of the incident lights.

11. The multicolor illumination device of claim 10, wherein the means further includes:
   a sensor coupled to the wavelength conversion element for sensing elative movement positions of the wavelength conversion element and generating sensor signals representing the start of the first or second time period; and
   a controller coupled to the sensor for generating control signals for turning the second light source off during the first time prior and on during the second time period based on the sensor signals.

12. A multicolor illumination device comprising:
   a first light source emitting a first light, the first light being a blue or UV light;
   a second light source emitting a second light, the second light being a red light;
   a wavelength conversion element having at least two segments, including a first segment free of any wavelength conversion material, and a second segment carrying a first wavelength conversion material which absorbs the first light and converts the absorbed first light into a third light having longer wavelengths than the absorbed first light; and optical elements for introducing the first and second lights onto the wavelength conversion element as incident lights, wherein the wavelength conversion element is moveable relative to the first and second light sources so that the first and second segments are alternatingly disposed in paths of the incident lights, wherein the first light source is turned on during at least a first time period when the second segment of the wavelength conversion element is disposed in the paths of the incident lights, and the second light source is turned on during at least a second time period when the first segment of the wavelength conversion element is disposed in the paths of the incident lights.

13. The multicolor illumination device of claim 12, wherein the wavelength conversion element further has a third segment either carrying a second wavelength conversion material which absorbs the first light and converts the absorbed first light into a fourth light having longer wavelengths than the absorbed first light or is free of any wavelength conversion material, and when the third segment is disposed in the paths of the incident lights, the first light source is turned on.

14. The multicolor illumination device of claim 13, wherein the third light emitted by the first wavelength conversion material is a green light, and the fourth light emitted by the second wavelength conversion material is a blue light.

15. The multicolor illumination device of claim 13, wherein the wavelength conversion element further comprises a fourth segment carrying a third wavelength conversion material which absorbs the first light and converts the absorbed first light into a yellow light.

16. The multicolor illumination device of claim 12, wherein the first light source is turned on only during the first time period and the second light source is turned on only during the second time period.

17. The multicolor illumination device of claim 16, further comprising:
   a sensor coupled to the wavelength conversion element for sensing elative movement positions of the wavelength conversion element and generating sensor signals representing the sensed positions; and
   a controller coupled to the sensor for generating control signals for turning on and off the first and second light sources based on the sensor signals.

18. A multicolor illumination device comprising:
   a first light source emitting a first light;
   a second light source emitting a second light;
   a wavelength conversion element having at least two segments, including a first segment free of any wavelength conversion material, and a second segment carrying a first wavelength conversion material which absorbs the first light and converts the absorbed first light into a third light having longer wavelengths than the absorbed first light;
   optical elements for introducing the first and second lights onto the wavelength conversion element as incident lights,
   wherein the wavelength conversion element is moveable relative to the first and second light sources so that the first and second segments are alternatingly disposed in paths of the incident lights;
   wherein the first light source is turned on during a first time period when the second segment of the wavelength conversion element is disposed in the paths of the incident lights and turned off during a second time period when the first segment of the wavelength conversion element is disposed in the paths of the incident lights, and the second light source is turned on during the second time period and turned off during the first time period.

19. The multicolor illumination device of claim 18, wherein the wavelength conversion element further has a third segment either carrying a second wavelength conversion material which absorbs the first light and converts the absorbed first light into a fourth light having longer wavelengths than the absorbed first light or is free of any wavelength conversion material, and when the third segment is disposed in the paths of the incident lights, the first light source is turned on.

20. The multicolor illumination device of claim 19, wherein the first light from the first light source is a blue or UV light, the second light from the second light source is a red light, the third light emitted by the first wavelength conversion material is a green light, and the fourth light emitted by the second wavelength conversion material is a blue light.

21. The multicolor illumination device of claim 20, wherein the wavelength conversion element further comprises a fourth segment carrying a third wavelength conversion material which absorbs the first light and converts the absorbed first light into a yellow light.

22. The multicolor illumination device of claim 19, further comprising:
   a sensor coupled to the wavelength conversion element for sensing elative movement positions of the wavelength conversion element and generating sensor signals representing the sensed positions; and
   a controller coupled to the sensor for generating control signals for turning on and off the first light source or the second light source or both based on the sensor signals.

* * * * *